US007065887B2

(12) United States Patent
Gallese

(10) Patent No.: US 7,065,887 B2
(45) Date of Patent: Jun. 27, 2006

(54) DEVICE FOR SUPPORTING THE WHEELS OF MOTOR VEHICLES IN GENERAL DURING THEIR ATTITUDE CHECK

(75) Inventor: Giacomo Gallese, Acqui Terme (IT)

(73) Assignee: Corghi S.p.A., Correggio (IT)

( * ) Notice: Subject to any disclaimer, the term of this patent is extended or adjusted under 35 U.S.C. 154(b) by 427 days.

(21) Appl. No.: 10/270,729

(22) Filed: Oct. 16, 2002

(65) Prior Publication Data

US 2003/0098206 A1 May 29, 2003

(30) Foreign Application Priority Data

Oct. 18, 2001 (IT) .......................... AL2001U0012

(51) Int. Cl.
*G01B 5/24* (2006.01)

(52) U.S. Cl. .............................. 33/203.12; 33/203.15; 33/203.17

(58) Field of Classification Search .................. 33/203, 33/520, 203.12, 203.15, 203.16, 203.17; 254/10 B, 124, 88
See application file for complete search history.

(56) References Cited

U.S. PATENT DOCUMENTS 29,375 A * 7/1860 Hinman ........................ 33/520
1,968,672 A * 7/1934 Duby ....................... 33/203.12
2,045,108 A * 6/1936 Smith ...................... 33/203.12
3,606,253 A * 9/1971 Wooten et al. ................ 254/88
3,875,672 A * 4/1975 Castoe .................... 33/203.12
4,447,042 A * 5/1984 Masui ........................ 254/124
4,460,158 A * 7/1984 Chiesa et al. ............... 254/124
4,567,667 A * 2/1986 Minagawa et al. ...... 33/203.12
4,924,591 A 5/1990 Brodu
5,054,207 A * 10/1991 Marshall .................. 33/203.12
5,267,380 A * 12/1993 Ronge et al. ............ 33/203.12
5,287,626 A * 2/1994 Reich ...................... 33/203.14
5,522,139 A * 6/1996 Rossato ................... 33/203.12
5,855,359 A * 1/1999 Chipperfield ................ 254/88
6,516,478 B1 * 2/2003 Cook et al. ................. 254/124

FOREIGN PATENT DOCUMENTS

DE 28 38 399 A1 3/1980
JP 61209833 A * 9/1986
JP 2000-304661 A 11/2000

* cited by examiner

*Primary Examiner*—Diego Gutierrez
*Assistant Examiner*—Travis Reis
(74) *Attorney, Agent, or Firm*—Browdy and Neimark, PLLC

(57) ABSTRACT

A device for supporting the wheels of vehicles in general during their attitude check, comprising a horizontal plate (8) which is supported in such a manner as to enable it to undergo rotation and translation within the plane in which it lies, about a position known as the zero position, and means able to disable the mobility of said plate, said means comprising a lower central appendix (11) which is rigid with the plate, and with which there is associated an automatic centering, retention and release system, which is activated and deactivated by a remote command.

8 Claims, 2 Drawing Sheets

DEVICE FOR SUPPORTING THE WHEELS OF MOTOR VEHICLES IN GENERAL DURING THEIR ATTITUDE CHECK

BACKGROUND OF THE INVENTION

1. Technology Field of the Invention

This invention relates in a totally general sense to the operations involved in checking and adjusting the attitude of motor vehicles in general.

More particularly, it relates to a device for supporting motor vehicle wheels during said operations.

2. Prior Art

For checking their attitude, motor vehicles are generally positioned on suitable vehicle lifts, the runways of which present at least two devices on which the front wheel tyres rest.

Devices are known for installation within a suitable seat in the runways of said vehicle lifts, and comprise a generally circular horizontal plate, which is supported by means enabling it to undergo rotation and translation within the plane in which it lies.

Said means generally consist of balls.

To prevent the plate being subjected to untimely and inconvenient impact and/or stresses, in particular while the vehicle is climbing onto the vehicle lift and descending therefrom, the known art provides for temporarily locking the plate to a base which rests on said lift.

For this purpose locking members such as latches or the like, all manually operated, are applied in various positions.

Such known systems have proved unsatisfactory because they require the intervention of the operator and involve undesirable time loss as he has to move from one to the other side of the vehicle lift each time the plate has to be locked and released.

Moreover to close the latches, the operator has to arrange the plate in a predetermined position in which the latches mate with their respective seats.

OBJECT AND SUMMARY OF THE INVENTION

The main object of the present invention is to eliminate the aforestated problem.

Another object is to achieve said result within the framework of a simple, rational, robust, reliable and economical construction.

Said objects are attained by a self-adjusting device having the characteristic elements indicated in the claims.

In a totally general sense, to achieve the stated objective the operations involved in centering, locking and releasing the movable plate are accomplished by a device remotely controlled by the operator.

By this means all the objects of the invention are attained.

In this respect, the operator no longer has to intervene directly on each individual movable plate, hence he does not need to move from one side of the vehicle lift to the other.

Specifically, according to the invention, the movable plate is provided with a coaxial rear appendix, such as a stem or the like, with which there is associated an automatic centering, retention and release system carried by the vehicle lift structure.

Said system can comprise two profiled jaws movable relative to each other with rectilinear mutual approach and withdrawal movement in a direction transverse to said appendix or stem, in a manner symmetrical about its neutral or zero position, i.e. the position in which it lies exactly at the centre of the intended range of translational movements, in all directions, of the movable plate within the plane in which it lies.

In particular, the active portions or claws of said jaws are shaped such as to cause the appendix to automatically return to said neutral or zero position at the moment of closure of said jaws. Finally, said two jaws can be placed under the control of at least one linear actuator, such as a cylinder-piston unit, preferably of pneumatic type.

BRIEF DESCRIPTION OF THE DRAWINGS

The constructional and operational characteristics and merits of the invention will be apparent from the ensuing detailed description given with reference to the accompanying drawings in which.

DETAILED DESCRIPTION OF THE PREFERRED EMBODIMENT

Figure 1:
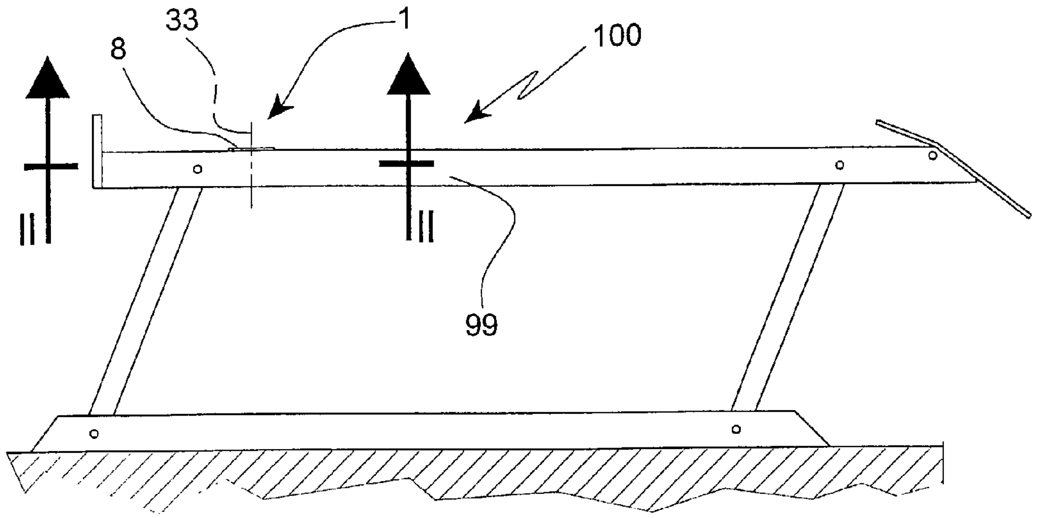
FIG. 1 is a schematic side view of a vehicle lift equipped with the invention.

Said figures, and in particular FIG. 1, show a vehicle lift indicated overall by the reference numeral 100, with two devices 1 of the invention respectively resting on the front part of each of its runways 99.

The tyres of the steered wheels of the vehicle to be subjected to the attitude check, the details of which are not relevant herein, are rested on said devices 1.

In FIG. 1 the reference numeral 33 indicates the vertical axis defining the neutral or zero position of the movable plate of the device 1.

Figure 2:
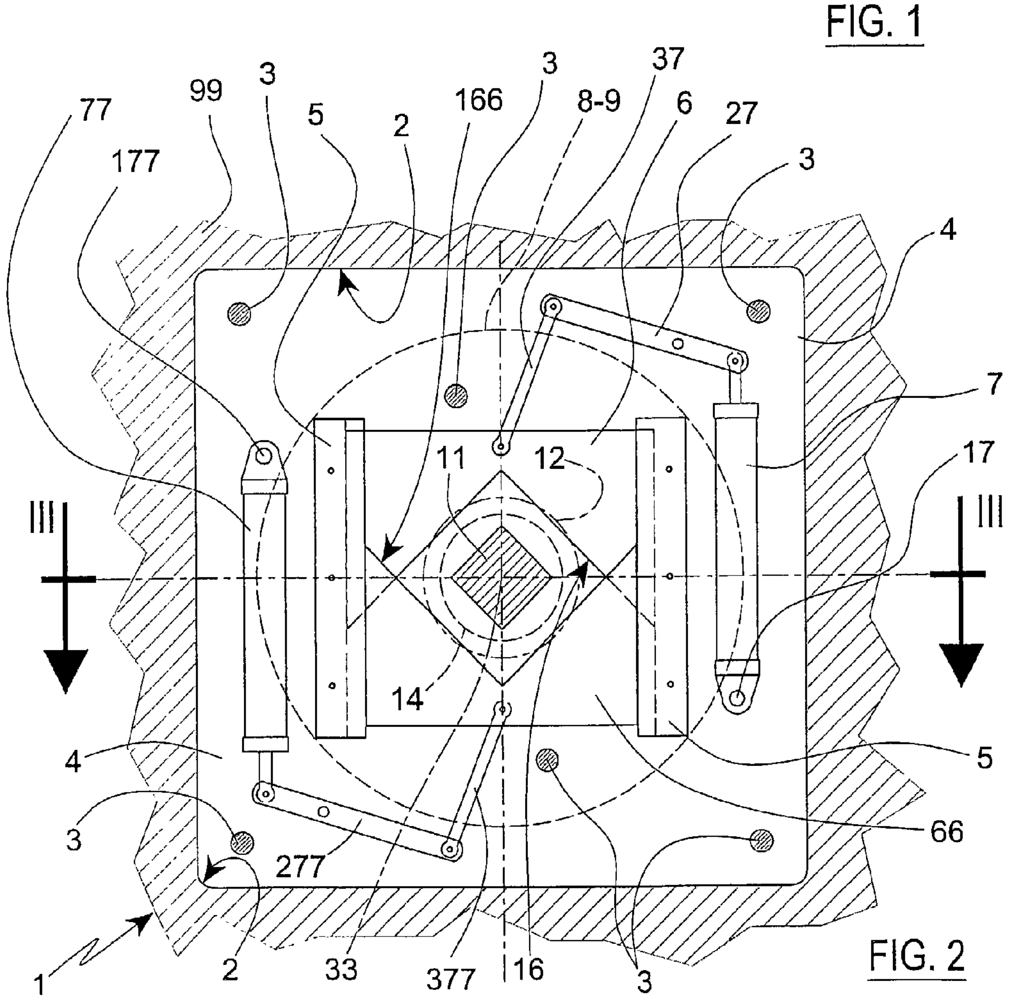
FIG. 2 is the section II—II of FIG. 1 on an enlarged scale.
Figure 3:
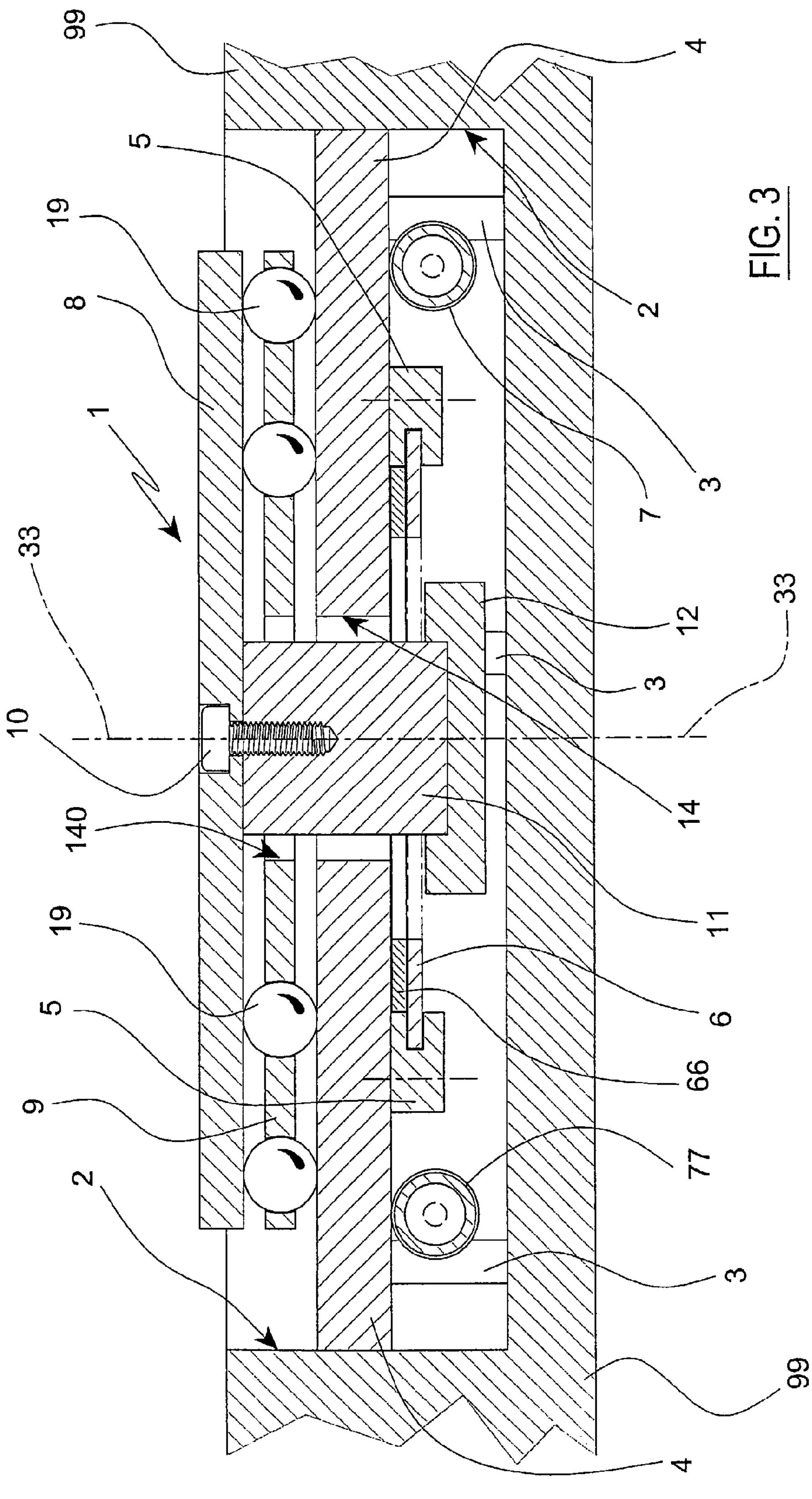
FIG. 3 is the section III—III of FIG. 2 on an enlarged scale.

As can be seen in FIGS. 2 and 3, each runway 99 is provided in its upper surface with a recess 2, on the base of which a plate 4 is fixed via a series of columns 3.

Below said plate 4, and straddling said zero position axis 33, there are fixed two parallel coplanar rectilinear guides 5, which in the illustrated embodiment are positioned transverse to the axis of the runway 99. In the facing sidewalls of said guides 5 there are provided the retention and slide tracks for a pair of jaws 6 and 66 which are driven to slide towards and away from each other with rectilinear movement in a direction transverse to and symmetrical about said axis 33.

Specifically, the upper pair of facing tracks provides the slideway for the jaw 66, the remaining pair of facing tracks providing the slideway for the jaw 6.

In FIG. 2 the jaws 6 and 66 are shown spaced apart, the device being shown in its zero position.

Said two jaws are each in the form of a single profiled metal slab. Said slabs forming said jaws 6 and 66 are positioned virtually in contact with each other and with the overlying plate 4 (FIG. 3).

The facing edges of the two jaws 6 and 66, i.e. their claws, present respective central recesses 16 and 166 with diverging perpendicular sides (FIG. 2) which open towards said axis 33.

As can be seen in FIG. 2, the outward and return strokes of each jaw 6 and 66 are implemented by a double-acting pneumatic cylinder-piston unit 7, 77 which are made to extend and contract by the operator by means of a system for controlling the service valves of the cylinder-piston units 7, 77, which system can be either associated with the vehicle lift 100 or be installed on the unit control panel which is connected to the vehicle lift 100 to collect the data relative to the attitude of the vehicle being checked.

The body of the cylinder-piston unit 7, 77 is hinged at 17, 177 to the overlying plate 4, its piston rod being pivoted to the end of a rocker lever 27, 277 which in an intermediate position is pivoted to the plate 4 and at its opposite end is pivoted to a connecting rod 37, 377 connected to the centre of the rear edge of the respective jaw 6 or 66.

At the centre of the plate 4 there is a circular hole 14 coaxial with the axis 33. Above the plate 4 there is a ball assembly supporting a circular plate 8.

The plate 8 extends slightly above the upper face of each runway 99, and is intended to support the front wheels of a vehicle.

The ball assembly comprises a disc 9 the diameter of which is of the same order of magnitude as the plate 8.

Said disc 9 presents at its centre a hole 140 having substantially the same diameter as the hole 14 of the plate 4, and at its periphery a regular plurality of identical holes housing metal balls of diameter greater than the thickness of the disc 9.

A preferably square pin 11 extending upwards from an anti-withdrawal disc 12 positioned against the jaw 6 is inserted through said central holes 14 and 140 from below.

The head of said square pin 11 is fixed to the underside of the plate 8 by a screw 10 which passes through this latter.

The circular profile of the disc 12 is greater than that of the gap made available by the recesses 16 and 166 in the jaws 6 and 66 respectively, when in their open configuration (see FIG. 2)

The gap existing between the pin 11 and the hole 14 defines the range through which the plate 8 can slide in all directions within the plane in which it lies.

The dimensions of the plate 8 are less than those of the recess 2.

The operation of the invention is evident.

When the operator activates the cylinder-piston units 7, 77 while the steered wheels of a vehicle are climbing onto or descending from the movable plates 8 of the devices 1 of the vehicle lift 100, the pairs of jaws 6 and 66 tighten against the respective pins 11 in such as manner as to perfectly align them with the axes 33, and to securely retain them thereat.

During the vehicle attitude check the operator deactivates said cylinder-piston units 7 and 77, so that the pins 11 are released and the plates 8 can both slide and rotate within the respective planes in which they lie, for example at the moment of a steering control test.

The merits and advantages of the invention are apparent from the aforegoing and from an examination of the accompanying figures.

The invention claimed is:

1. A device for supporting the wheels of vehicles in general during their attitude check, comprising a horizontal plate (8) which is supported on the device to enable it to undergo rotation and translation within the plane in which it lies, about a position known as the zero position, and first apparatus to disable the mobility of said plate, wherein said first apparatus comprises a lower central appendix (11) fixed to the plate, and an automatic centering, retention and release system, which is activated and deactivated by a remote command and engageable with the appendix, said system comprising two jaws each having opposite sides guided to move in a linear direction relative to each other to mutually engage and disengage the jaws to said appendix transverse to the length of said appendix in a manner symmetrical about said zero position, wherein the movement of said jaws is controlled by at least one linear actuator pivotably engaged on the device with an axis of the actuator substantially parallel and adjacent to the guided sides of the jaws.

2. The device as claimed in claim 1, wherein active portions of said two jaws each present a central recess with converging sides which opens towards said zero position.

3. The device as claimed in claim 1, wherein said remote command is provided by a second apparatus arranged to operate service valves of said at least one actuator.

4. The device as claimed in claim 3, wherein said second apparatus is a remote controller operated by a user.

5. The device as claimed in claim 1, wherein said actuator is a pneumatic cylinder piston unit.

6. The device as claimed in claim 5, wherein said pneumatic cylinder piston unit comprises a piston rod pivoted to a pivoting rocker lever connected to a connecting rod linked to the center of a back side of one of the jaws.

7. The device as claimed in claim 6, having two pneumatic cylinder piston units.

8. The device as claimed in claim 1, wherein said at least one actuator lies in a plane parallel to that of said jaw.

* * * * *